United States Patent
Fujita

(10) Patent No.: US 6,950,965 B2
(45) Date of Patent: Sep. 27, 2005

(54) PROGRAM PROCESSING DEVICE AND PROGRAM RECOVERY METHOD

(75) Inventor: Shinji Fujita, Iruma (JP)

(73) Assignee: TEAC Corporation, Musashino (JP)

( * ) Notice: Subject to any disclaimer, the term of this patent is extended or adjusted under 35 U.S.C. 154(b) by 503 days.

(21) Appl. No.: 10/136,340

(22) Filed: May 2, 2002

(65) Prior Publication Data

US 2002/0170001 A1 Nov. 14, 2002

(30) Foreign Application Priority Data

May 8, 2001 (JP) ........................................ 2001-137861

(51) Int. Cl.[7] .............................................. G06F 11/00
(52) U.S. Cl. ............................................ 714/38; 714/2
(58) Field of Search ................................ 714/38–39, 2, 714/15–16, 17, 47; 717/124, 127–128, 168

(56) References Cited

U.S. PATENT DOCUMENTS

| | | | | |
|---|---|---|---|---|
| 5,321,832 A | * | 6/1994 | Tanaka et al. ............... | 707/204 |
| 5,471,609 A | * | 11/1995 | Yudenfriend et al. .......... | 714/4 |
| 5,586,247 A | * | 12/1996 | Yoshifuji et al. .............. | 714/2 |
| 5,671,350 A | * | 9/1997 | Wood .......................... | 714/15 |
| 6,230,282 B1 | * | 5/2001 | Zhang .......................... | 714/6 |
| 6,615,404 B1 | * | 9/2003 | Garfunkel et al. .......... | 717/173 |
| 6,732,293 B1 | * | 5/2004 | Schneider .................... | 714/15 |

* cited by examiner

Primary Examiner—Dieu-Minh Le
(74) Attorney, Agent, or Firm—Oliff & Berridge, PLC

(57) ABSTRACT

A device has a program upgrading capability. Upon start-up, a CPU checks if an upgrading program is stored in an EEPROM, and, if stored, a main program is overwritten with the upgrading program and then the main program is started. The program generates a signal within a predetermined time after start-up, if the program runs properly. If no such signal is detected within the predetermined time, the CPU overwrites the upgrading program with a shipment state program which stored in the EEPROM.

15 Claims, 5 Drawing Sheets

PROGRAM PROCESSING DEVICE AND PROGRAM RECOVERY METHOD

BACKGROUND OF THE INVENTION

1. Field of the Invention

The present invention relates generally to a computer-based program processing device and a method for recovering a program, and particularly to recovering a program during program upgrade.

2. Description of the Related Art

In the recent growth of computer-based devices, computers are required to process more complicated tasks. Usually, the computers read and execute programs stored in a storage medium, such as a ROM (Read Only Memory) or a hard disk. The programs, however, often include bugs, which also may be generated artificially or caused by other factors. Also, users may sometimes desire to add a new function to the device. A known method to address these problems is so-called version upgrading of a program for introducing a new program to eliminate bugs or introduce new functionality.

In a conventional upgrading method, however, a bug existing in the new software may make operation of the device unstable, sometimes preventing reliable operation of the device.

For example, in a recording device for recording the content of a telephone call, such as commonly used in a telephone support centers, business may be seriously hampered by a bug in new software to block recording of the content of telephone calls. Thus, in terms of reliability, a huge amount of time and effort would be required to upgrade the processing software. This is also true for other devices which operate based on software.

SUMMARY OF THE INVENTION

It is an object of the present invention to enable hardware to operate even if an upgrading program is unexecutable due to a bug or the like contained therein.

A program processing device according to the present invention includes a rewritable storage means for storing a main program and a recovery program in separate areas, and a processing means for reading the main program from the storage means and executing the main program. The processing means overwrites the main program with the recovery program when the main program is unexecutable. The main program may be an upgrading program, for example, which overwrites the existing program for upgrade. When a bug is included in the upgrading program, the recovery program automatically overwrites the upgrading program, allowing for the stable operation of the hardware by executing the recovery program.

Although it is desirable that overwriting of the main program with the recovery program be performed during the execution of the main program, overwriting is sometimes prohibited while the main program is executed. In such a case, the processing means first copies the recovery program to an area of the storage means other than the area of the main program, and then proceeds to overwrite the main program with the copied recovery program.

In one embodiment of the present invention, the main program is programmed to generate a predetermined signal within a predetermined time after start-up, and, when no such predetermined signal is detected within the predetermine time, the processing means overwrites the main program with the recovery program, or copies the recovery program in the area other than the main program area and then overwrites the main program.

The present invention also provides a program recovery method. The method includes the steps of (a) determining whether or not a main program is executable, and (b) if an unexecutable state of the main program is determined, overwriting the main program with a recovery program which is already stored in an area of the storage means other than the area of the main program, and (c) executing the recovery program.

Also, the present invention provides a program upgrading method. The method includes the steps of (a) determining whether or not an upgrading program is present in a storage means, (b) when the presence of the upgrading program is detected, overwriting a main program with the upgrading program, (c) determining whether or not the upgrading program is unexecutable, (d) when an unexecutable state of the upgrading program is determined, overwriting the upgrading program with a recovery program which is already stored in an area of the storage means other than the area of the upgrading program, and (e) executing the recovery program. If overwriting of the upgrading program is prohibited during its execution, the step (d) may be carried out in two steps of (d1) copying the recovery program to an area of the storage device where the upgrading program is originally stored, and (d2) overwriting the upgrading program with the recovery program.

The present invention will be more readily understood with reference to the following description of a preferred embodiment.

DESCRIPTION OF THE PREFERRED EMBODIMENT

An embodiment of the present invention will be described below with reference to the attached drawings. It should be noted that although a device for recording the content of telephone calls (a telephone call recording device) will be discussed as an example of a program processing device in the following description, the present invention is not limited thereto and is applicable to any device utilizing a computer as a program processing device for executing software.

Figure 1:
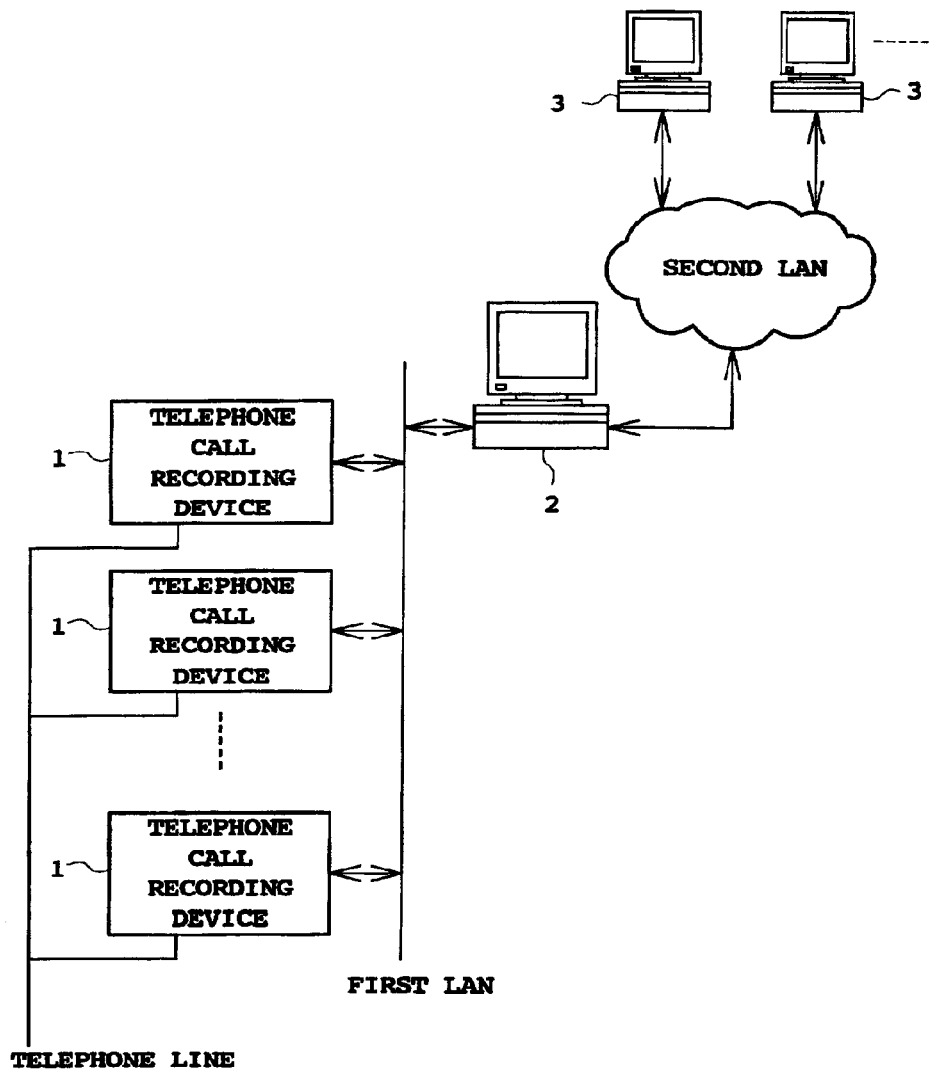
FIG. 1 is a block diagram showing the configuration of a telephone call recording system.

FIG. 1 is a block diagram showing the structure of a telephone call recording system which includes a telephone call recording device serving as a program processing device. As shown in FIG. 1, the telephone call recording system includes a plurality of telephone call recording devices 1 connected to a subscriber line, a call logger PC 2 connected to the telephone call recording devices via a first LAN (Local Area Network), and an at least one call player PC 3 connected to the call logger PC 2 via a second LAN.

Figure 2:
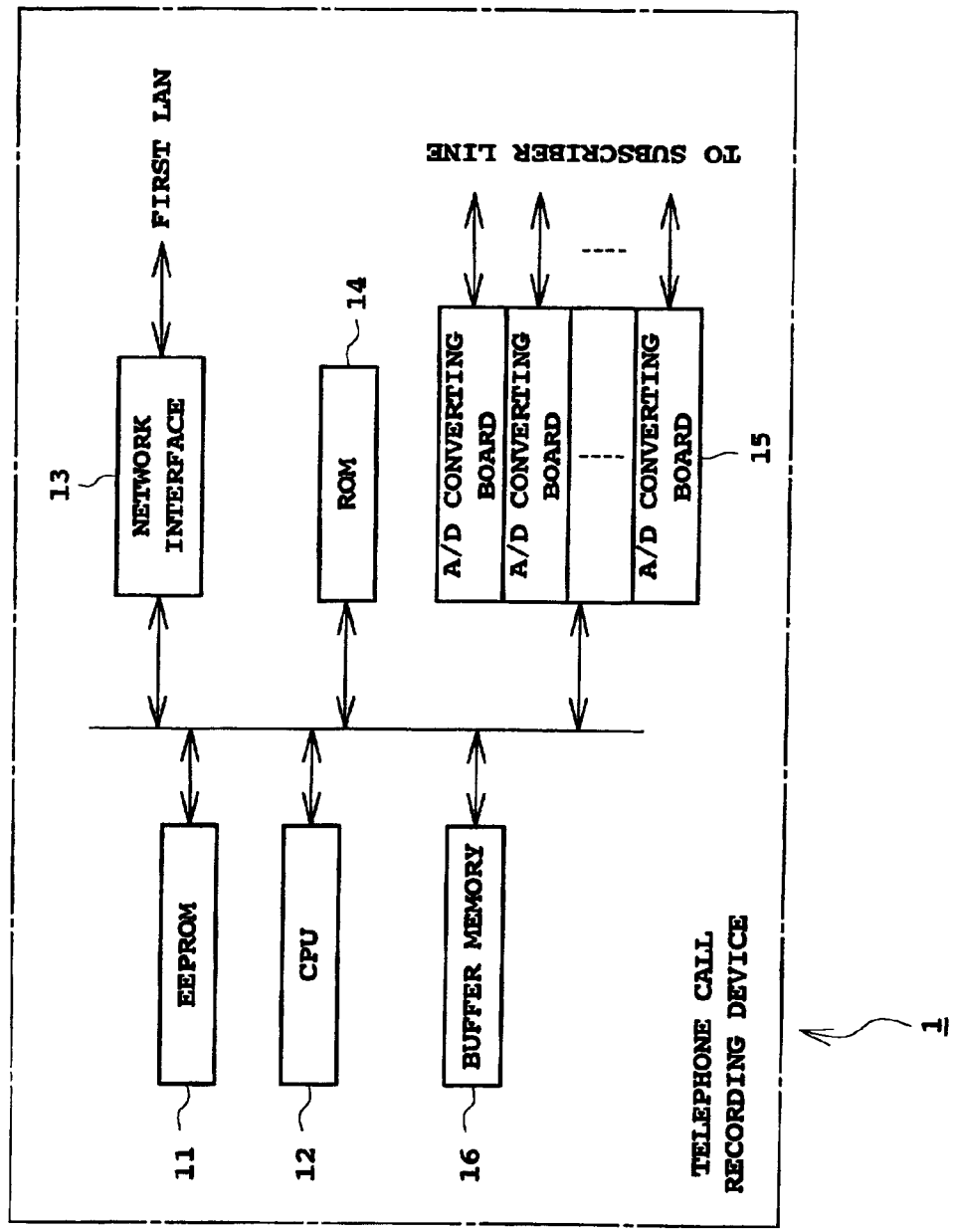
FIG. 2 is a block diagram showing the configuration of the telephone call recording device of FIG. 1.

As shown in FIG. 2, the telephone call recording device 1 includes an EEPROM 11, a CPU 12, a network interface 13, a ROM 14, A/D converting boards 15, and a buffer memory 16. It should be noted that although none is shown in the figures a computer usually includes a clocking means, such as a timer.

The EEPROM 11 of the telephone call recording device 1 stores a program (a normal program) which is to be executed by the CPU 12 and a program (a shipment state program) which is preset at the time of shipment from factory. The shipment state program serves as a recovery program. Also, the EEPROM 11 separately maintains a new program supplied from the CPU 12.

The CPU 12 executes the program stored in the EEPROM 11. The CPU 12 carries out various types of processes, such as start or finish operation of the program, based on an multitasking operating system like such as, for example, the commonly used Windows® CE system software. Because the operation of such management software is well known, no further description will be provided herein. Basically, the CPU 12 carries out the processes of receiving a new program for upgrade (reception process), starting the program (starting process), recording a telephone call in accordance with the program (normal process), and supervising how the program is executed (supervising process). Each process of the CPU 12 will be described in detail later.

The network interface 13 is connected to the first LAN and transfers data received from the call logger PC 2 through the first LAN to the CPU 12. Also, the network interface 13 transmits data to the call logger PC 2 in accordance with an instruction from the CPU 12. The ROM 14 stores the start-up program of the CPU 12 which is intended to be executed upon start-up of the telephone call recording device 1. In particular, the ROM 14 stores a program for reading the management program.

The A/D converting boards 15 consist of a plurality of A/D converting boards, with each A/D converting board serving to convert voice signals supplied through the subscriber line to digital signals and outputs them to the CPU 12. The buffer memory 16 may be, for example, a flash ROM which converts accumulated voice signals into a digital format, in response to an instruction from the CPU 12.

Next, each process of the CPU 12 will be described in detail. First, the operation of the program during normal processing will be described. A software program for normal processing (hereinafter referred to as a normal program) is started from the management program and issues a predetermined signal within a predetermined period after start-up. The signal may represent communication of messages between programs implemented by the OS, or communication between programs in compliance with a predetermined network protocol. Alternatively, the signal may represent a file with a particular name. For example, assuming that the normal program generates a log file upon finishing the initial setup process, the CPU 12 can confirm the presence of the log file after a predetermined time has passed to check the operation state of the normal program. Checking the operation state of the normal program will be described later in connection with the supervising process.

When the normal program is executed properly, the CPU 12 correspondingly encodes a voice signal supplied from the A/D converting boards 15 into a digital format and stores the converted signal as encoded data in the buffer memory 16. When the subscriber line is disconnected, the CPU 12 transfers the encoded data stored in the buffer memory 16 to the call logger PC 2 via the first LAN.

[Reception Process]

The reception process of the CPU 12 will be described. The CPC 12 receives the new program from the call logger PC 2 through the first LAN and stores it in a predetermined area (a first area) of the EEPROM 11. It should be noted that the term "area" as used herein indicates not only a predetermined range of address of the EEPROM 11, but also indicates a predetermined file name (e.g., "prog0"). The normal program is stored in another area (a second area) of the EEPROM 11.

[Starting Process and Supervising Process]

Figure 3:
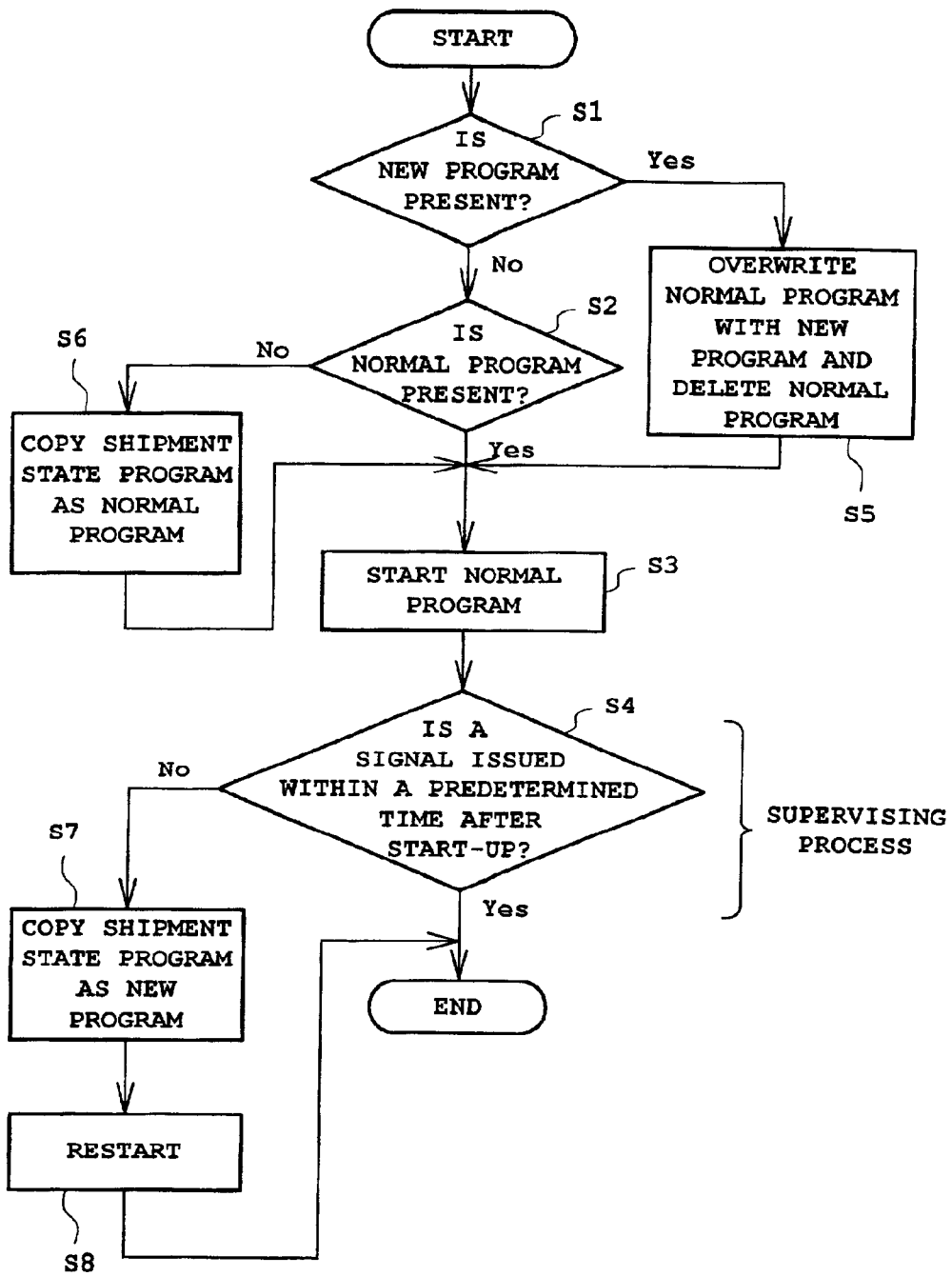
FIG. 3 is a flowchart showing the processing carried out by the telephone call recording device.

Upon starting the device, the CPU 12 carries out the starting process of the program as shown in FIG. 3. Specifically, the CPU 12 looks at the first area of the EEPROM 11 to check if the new program is stored therein (S1). If the new program is not stored, the CPU 12 proceeds to check if the normal program (e.g., called "prog1" herein) is stored in the area (the second area) intended for storage of the normal program to be executed(S2). If the new program is detected, the CPU 12 starts the normal program (S3). Then, the CPU 12 starts the supervising process in which the CPU 12 activates a timer which is not shown and waits until a predetermined time has passed, while checking if the normal program started in the process S3 has issued a signal (or if a predetermined file, such as a log file, is generated) (S4). When the signal is issued within the predetermined time interval, the starting process ends accordingly, and the CPU 12 continues execution of the normal program. It is noted that although the process S4 or the supervising process is shown integrally in the flow chart, the process may be implemented as a management program or a resident supervision program.

In the process S1, if the new program is stored, the second area is overwritten so that the new program is copied there, and then the new program is deleted (including renaming prog0 to prog1, for example) (S5). Then, the process proceeds to S3. In the process S2, if the normal program is not stored, the shipment state program (e.g., progX) is read from a predetermined area (a third area) of the EEPROM 11, and is copied in the second area (i.e., progX is copied as prog1) (S6), and the process then proceeds to S3.

When it is determined that no signal has been issued within the predetermined time interval in the supervising process S4, the CPU 12 reads the shipment state program (progX) from the predetermined storage area (the third area) and copies it in the first area (i.e., progX is copied as prog0) (S7), and then restarts the device (S8) to finish the process. After the device is restarted, the presence of the new program is detected in the process S1, and the normal program is overwritten with the shipment state program and the shipment state program is executed. Thus, the telephone call recording device 1 can operate by the shipment state program. It should be noted that although the restart is described as being instructed by software, restart may be performed manually. In such a case, the process S8 may be eliminated and the normal program which is then being executed is forcibly quit.

Figure 4A:
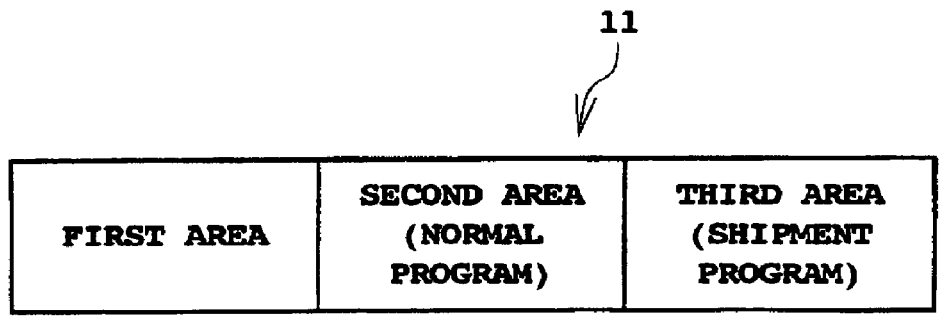
FIG. 4A shows an initial state of the EEPROM of FIG. 2.
Figure 4B:
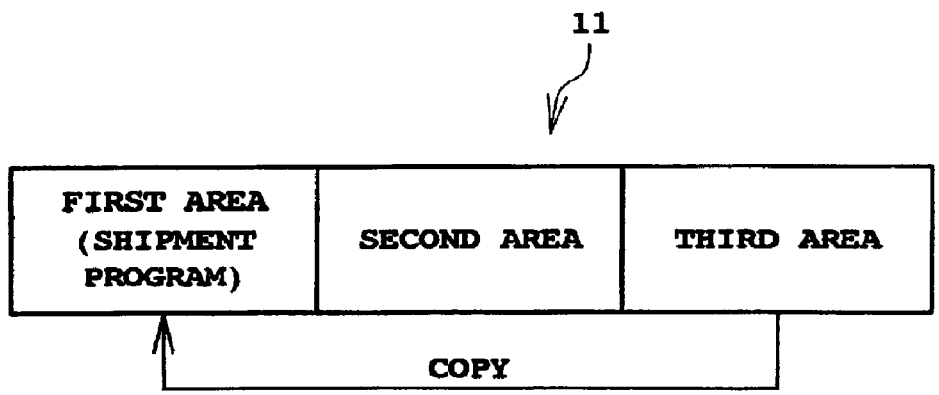
FIG. 4B shows the EEPROM of FIG. 2 wherein a shipment state program is copied.
Figure 4C:
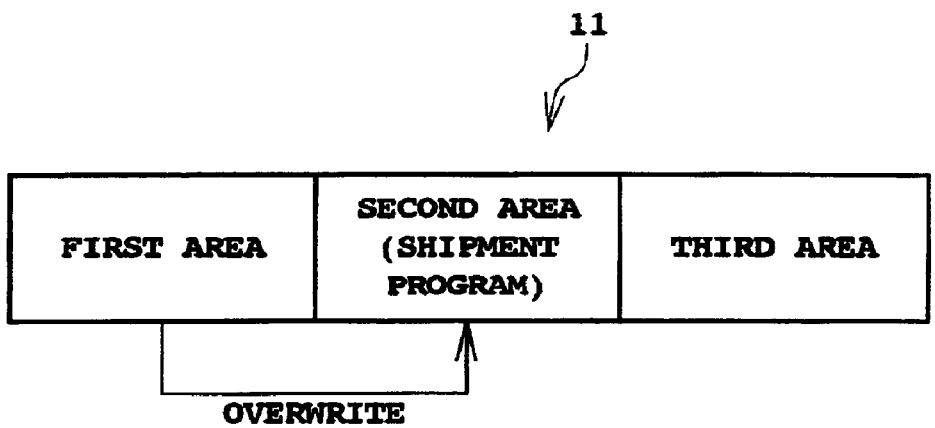
FIG. 4C shows the EEPROM of FIG. 2 wherein a normal program is overwritten by the shipment state program.

FIGS. 4A, 4B, and 4C illustrate models of the processes mentioned above. Looking at the shipment state program (or the recovery program), when the normal program is unexecutable, the shipment state program is copied from the third area to the first area and to the second area.

The call logger PC 2 normally accumulates the encoded data received from the telephone call recording device 1, and sends the encoded data to a particular call player PC 3 in response to an instruction received from this call player PC 3. The call logger PC 2 reads the new program from a computer-readable recording medium, such as a CD-ROM, and transmits the new program to the plurality of telephone call recording devices 1 at a time or in seriatim via the first LAN. The call player PC 3 sends an instruction to the call logger PC 2 ordering it to selectively transmit the encoded data accumulated in the call logger PC 2 to the call logger PC 3, and decodes the encoded data received in response to the instruction into the voice signal and reproduce it.

Next, the upgrading operation of the telephone call recording device 1 will be described. The new upgrading program read by the call logger PC 2 is sent to the telephone call recording device 1 via the first LAN, and is stored in the first area of the EEPROM 11 as "prog0". At the next start-up, when the telephone call recording device 1 detects the presence of "prog0", it deletes "prog1" which runs abnormally, renames "prog0" as "prog1", stores it in the second area of the EEPROM 11, and then starts the renamed "prog1". Because "prog1" contains a routine for generating a signal within a predetermined time after start-up, the signal is issued as long as the program runs properly, allowing the CPU 12 to recognize the proper operation of the program. Then, the upgrading process ends.

If the program does not run properly (i.e., if "prog0" includes a bug), it is impossible to detect the signal within the predetermined time after starting the renamed "prog1", indicating an occurrence of abnormal condition. In such a case, the CPU 12 forcibly exits the "prog1". At the same time, the CPU 12 replaces the "prog1" with the shipment state program, "progX", and copies it in the first area of the EEPROM 11 by overwriting the existing abnormal "prog1", so that the device can be started properly in the future.

As a result, the "prog1" (corresponding to the shipment state program "progX") is started at the next start-up and executed properly.

Although the telephone call recording device has been described as an example in the foregoing description, the program processing device of the present invention can be implemented as a process of a normal multitasking type OS and is not limited to the above-described application.

Figure 5A:
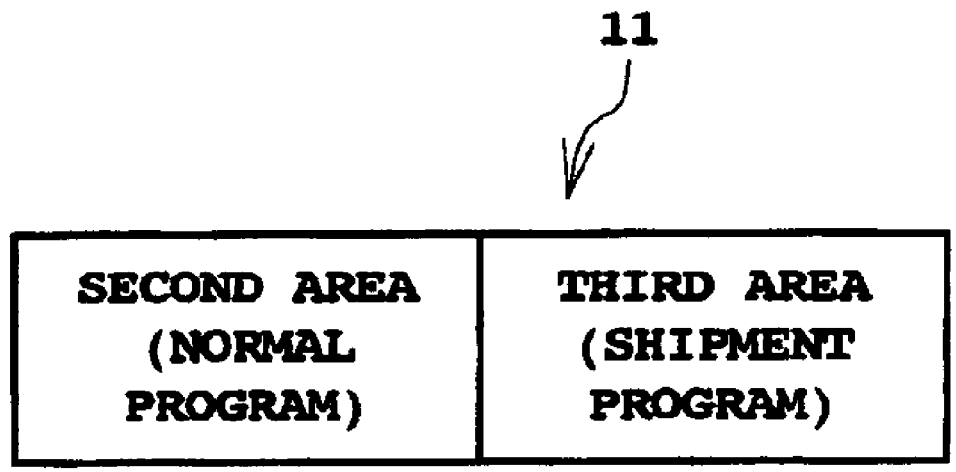
FIG. 5A shows an alternative example of the initial state of the EEPROM of FIG. 2.
Figure 5B:
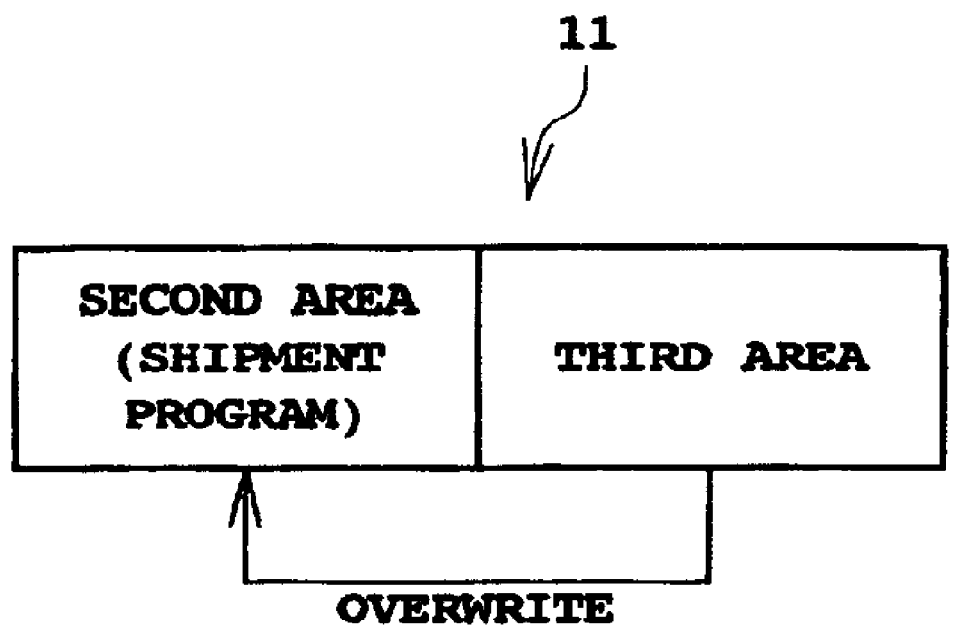
FIG. 5B shows an alternative example of the EEPROM of FIG. 2 wherein the normal program is overwritten by the shipment state program.

It is assumed that the above example utilizes Windows® CE as the OS. In such a case, if it is desired to overwrite a program file by another file during execution of the program, file copying is interrupted because the OS bans such overwriting. To address this consideration, the area "prog0" is made to verify whether or not the upgrade is necessary before initiating the program and to rename the file. However, if an OS which allows overwriting of the program file during execution is employed, it is possible to directly overwrite the "prog1" with the "progX". In this case, both the area "prog0" and the renaming process can be eliminated. The processing in such a case is illustrated in FIGS. 5A and 5B, wherein the shipment state program is directly copied from the third area to the second area, and then executed.

Although the embodiment of the present invention has been described above, it should be understood that the present invention is not limited thereto. Instead, it is intended to cover many variations and modifications, as will be apparent to those skilled in the art. For example, although in the description of the above embodiment, the abnormal condition of the normal program is detected by checking if the normal program has generated a log file within a predetermined time after start-up, it is also possible, however, to employ other known methods to determine whether or not the normal program is unexecutable. In addition, although the shipment state program generates a log file a predetermined time after start-up in the above embodiment, the ability to generate such signal may be eliminated, as long as the minimum function required for serving as the recovery program is provided.

What is claimed is:

1. A program processing device, comprising:
   storage means for storing a main program and a recovery program in separate areas, and
   processing means for reading said main program from said storage means and executing said main program, said main program generating a predetermined signal within a predetermined time after start-up,
   wherein said processing means overwrites said main program with said recovery program when no said predetermined signal is detected within said predetermined time.

2. A program processing device according to claim 1, wherein, when said main program is unexecutable, said processing means copies said recovery program in an area of said storage means other than the area of said main program, and then overwrites said main program with said copied recovery program.

3. A program processing device according to claim 1, wherein said predetermined signal is generated by creating a predetermined file.

4. A program processing device according to claim 1, wherein said predetermined signal is a predetermined message determined by an operating system.

5. A program processing device according to claim 1, wherein said recovery program generates a predetermined signal within a predetermined time after start-up.

6. A program processing device according to claim 1, wherein said program processing device is a telephone call recording device for recording the content of a telephone call.

7. A program processing device, comprising:
   storage means for storing an upgrading program, a main program, and a recovery program in first, second, and third areas, respectively, of said storage means; and
   processing means for reading said main program from said storage means and executing said main program,
   wherein said processing means overwrites said main program stored in said second area with said upgrading program stored in said first area, and
   wherein, when said upgrading program is unexecutable, said processing means again overwrites said upgrading program stored in said first area with said recovery program stored in said third area.

8. A program processing device according to claim 7, wherein, when said upgrading program is unexecutable, said processing means copies said recovery program in said first area, and then overwrites said upgrading program in the second area with said recovery program copied to said first area.

9. A program processing device according to claim 8, wherein said processing means overwrites said main program stored in said second area with said upgrading program stored in said first area, and then deletes said upgrading program stored in said first area.

10. A program processing device according to claim 8, wherein said upgrading program generates a predetermined signal after a predetermined time after start-up, and wherein, when no said signal is detected within said predetermined time, said processing means copies said recovery program in said first area, and then overwrites said second area with said copied recovery program.

11. A program processing device according to claim 7, wherein said upgrading program generates a predetermined signal within a predetermined time after start-up, and wherein, when no said predetermined signal is detected within said predetermined time, said processing means overwrites said second area with said recovery program.

12. A program recovery method, comprising the steps of:
(a) determining whether or not a main program is unexecutable by detecting a predetermined signal generated by said main program within a predetermined time after start-up;
(b) when an unexecutable state of said main program is determined, overwriting said main program with a recovery program which is already stored in an area of a memory other than the area of said main program; and
(c) executing said recovery program.

13. A program recovery method according to claim 12, wherein said step (b) includes the steps of:

(b1) when the unexecutable state is determined, copying said recovery program in an area of said memory other than the area of said main program; and
(b2) overwriting said main program by said copied recovery program.

14. A program upgrading method, comprising the steps of:
(a) determining whether or not an upgrading program is present in a memory;
(b) when the presence of said upgrading program is determined, overwriting a main program with said upgrading program;
(c) determining whether or not said upgrading program is unexecutable,
(d) when an unexecutable state of said upgrading program is determined, overwriting said upgrading program with a recovery program which is already stored in an area of said memory other than the area of said upgrading program; and
(e) executing said recovery program.

15. A program upgrading method according to claim 14, wherein said step (b) includes the step of deleting said original upgrading program after overwriting said main program by said upgrading program, and
wherein said step (d) includes the steps of:
(d1) copying said recovery program in the area of said memory where said upgrading program is originally stored; and
(d2) overwriting said upgrading program with said copied recovery program.

* * * * *